United States Patent [19]
Feuillade

[11] 3,808,487
[45] Apr. 30, 1974

[54] METHOD OF CHARGING A STORAGE BATTERY AND OF DETECTING THE TERMINATION OF CHARGING

[75] Inventor: Georges Feuillade, Arpajon, France

[73] Assignee: Compagnie Generale D'Electricite, Paris, France

[22] Filed: May 12, 1972

[21] Appl. No.: 252,802

[30] Foreign Application Priority Data
May 12, 1971  Germany............................ 7117082

[52] U.S. Cl........................ 320/21, 320/39, 320/43, 320/48, 324/29.5
[51] Int. Cl........................ H02j 7/00, G01n 27/46
[58] Field of Search............ 320/21, 22, 39, 40, 48, 320/43; 324/29.5

[56] References Cited
UNITED STATES PATENTS

| | | | |
|---|---|---|---|
| 3,278,823 | 10/1966 | Ross | 320/39 X |
| 3,602,794 | 8/1971 | Westhaver | 320/39 |
| 3,424,969 | 1/1969 | Barry | 320/21 |
| 3,621,359 | 11/1971 | Schnegg | 320/48 X |
| 3,258,671 | 6/1966 | Wales | 320/22 |
| 3,676,770 | 7/1972 | Sharaf et al | 320/48 X |

Primary Examiner—J. D. Miller
Assistant Examiner—Robert J. Hickey
Attorney, Agent, or Firm—Sughrue, Rothwell, Mion, Zinn & Macpeak

[57] ABSTRACT

A method of charging a storage battery and of detecting the termination of charging, including detecting by suitable means, the variations of at least one of the parameters of the modified charging signal, known as the answer signal, after its passage through the battery. The answer signal is a function of the operational impedance of the battery. A significant change in the answer signal occurs at the completion of the charging.

11 Claims, 7 Drawing Figures

METHOD OF CHARGING A STORAGE BATTERY AND OF DETECTING THE TERMINATION OF CHARGING

BACKGROUND OF THE INVENTION

1. Field of the Invention

The present invention relates to a method for charging a storage battery and for detecting the termination of charging.

2. Description of the Prior Art

In known methods of charging storage batteries the termination of charging is determined when the potential of the plates, more particularly the negative plates, reaches a predetermined value. This value may vary according to the temperature of the battery, its construction as well as its age and state.

In these methods, a descending reference or connecting electrode is used with the electrolyte of the battery.

Although these methods can be implemented in the case of conventional batteries, they cannot be used in the case of sealed batteries.

Moreover, since the potential value of the plates corresponding to the termination of charging, is subject to the fluctuations mentioned above, said value must be constantly readjusted in the course of each charging process. This involves a considerable waste of time and provides poor sensitivity.

SUMMARY OF THE INVENTION

The present invention allows these disadvantages to be avoided.

The object of the invention is to provide a method for charging a storage battery and for determining with ease and accuracy the termination of the charging. This method is especially simple to implement and offers a high standard of reliability.

Thus the object of the invention is a method of charging a storage battery and of determining the termination of charging by means of a charging signal having a periodic time-dependent variation, characterized in that the variations of at least one of the parameters of said signal, modified after its passage through the battery, are determined by suitable means. The modified signal, which is known as the answer signal, is dependent on the operational impedance of the battery. The termination of charging is determined by a marked variation in the answer signal.

BRIEF DESCRIPTION OF THE DRAWINGS

Other features and advantages of the invention will be disclosed in the following description which is provided by way of a purely illustrative and non-limitative example with reference to the accompanying drawings in which.

DESCRIPTION OF THE PREFERRED EMBODIMENT

Figure 1:
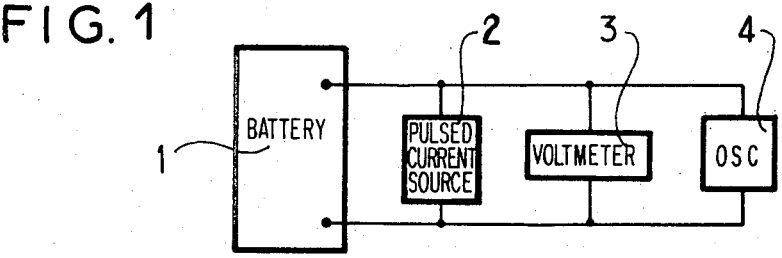
FIG. 1 represents the preferred embodiment of a device for implementing the method of charging and determining the termination thereof according to the invention.

FIG. 1 shows a device implementing the method according to the invention for charging a battery 1 and for determining the termination of charging. This device comprises a pulsed current source 2 having a very low residual frequency, preferably between 0.1 and 0.01 Hertz. The battery answer signal, in this case the voltage, is monitored by means of a voltmeter 3 having a low time constant and/or registered by an oscilloscope 4.

Figure 2:
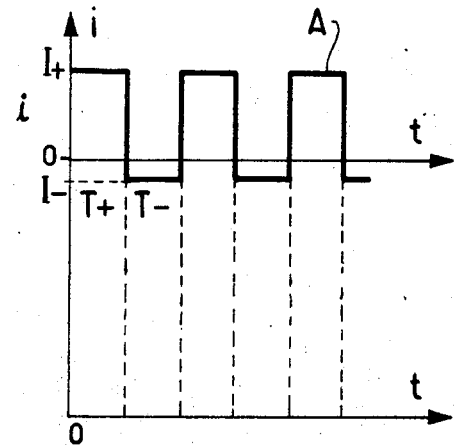
FIG. 2 shows the features of a charging signal suitable for use in the implementation of the invention.

The curve A of FIG. 2 represents in terms of the time $t$ the intensity $i$ of the charging signal which is pulsed periodically according to a frequency of some tenths to some hundredths of Hertz. The intensity varies between a positive value $I^+$ and a negative value $I^-$ (or possibly a zero value) not exceeding 10 to 20 percent of the positive value. The positive and negative phases of the signal are designated respectively by $t^+$ and $t^-$. These values may be equal.

Curve B, which is also shown in FIG. 2, shows the corresponding form of the answer signal V of the battery in terms of the time $t$ during charging. The amplitude of the alternative part of this signal is designated by $v$ and its mean value by $\bar{V}$.

Figure 3:
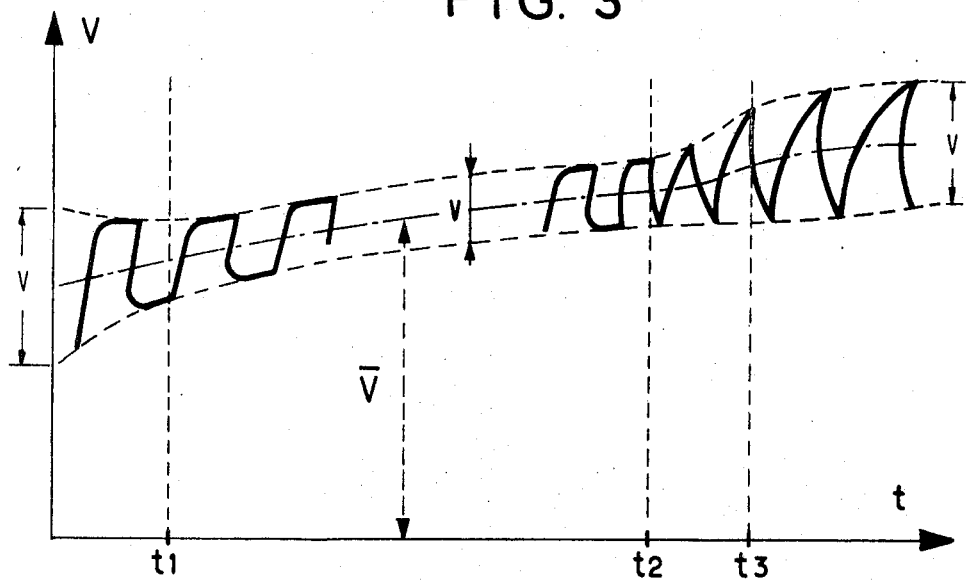
FIG. 3 shows the variation in the battery answer signal in the course of charging.

FIG. 3 shows the variation in the battery answer signal during charging, in this case, the voltage $v$ is dependent on the time $t$.

The graph shows that the amplitude $v$ of the signal decreases initially until it reaches the time $t1$. This decrease at the commencement of charging corresponds to the stabilization of the kinetics of the electrodes. Then, during charging, that is, during the period $t1$ to $t2$, said amplitude $v$ maintains a substantially constant value while the value of the mean voltage $\bar{V}$ increases in a regular manner.

From the time $t2$ onward there is a relatively rapid increase in the amplitude $v$ and the mean value $\bar{V}$ of the answer signal and a change in the shape of the signal. This variation continues until it reaches the time $t3$, at which the amplitude $v$ reaches a value which is double that of the charging value. This zone, which corresponds to the variation in the percussive impedance of the element associated with the kinetic change in the electrode, precedes the zone of marked gaseous discharge occurring from the time $t3$ onward. In the latter zone the amplitude $v$ maintains a substantially constant value.

The charging process may thus be advantageously interrupted during the period $t2$ to $t3$.

The variation in the form of the answer signal during charging and in the zone of kinetic change of the electrode respectively, may be easily detected by visual observation. This variation may be further amplified by increasing the periods $T^+$ and $T^-$ of the charging signal.

It is also possible to effect charging by means of a continuous current superimposed on a very low frequency sinusoidal excitation, not exceeding 1 to 10 Hertz and having a voltage amplitude of some tens to some hundreds of millivolts. FIG. 2 illustrates a charging current of this type. A sinusoidal current $i_1$ is superimposed on a DC current $i_0$ to produce the resulting charging current. Detection may be effected by means of a voltmeter having a low time constant or by a Lissajous method.

Figure 4:
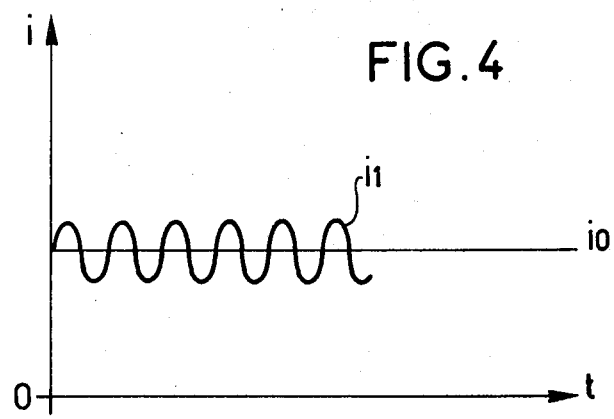
FIG. 4 shows a charging signal used in an alternative embodiment of the present invention.
Figure 5:
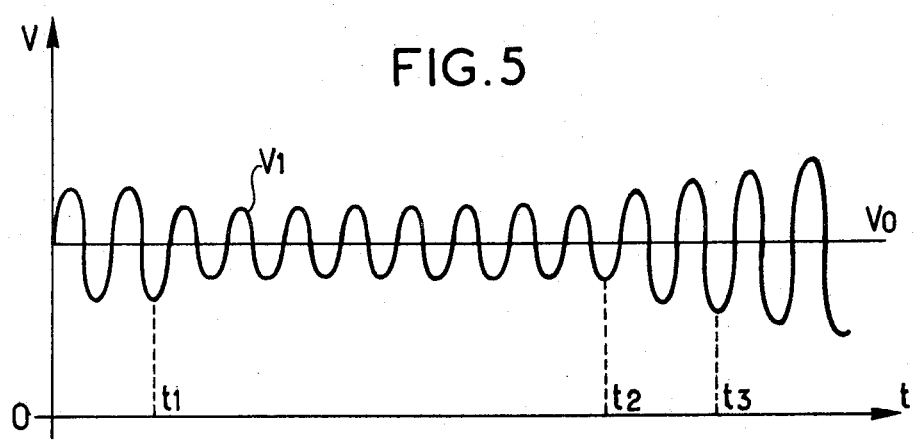
FIG. 5 shows the variation in the battery answer signal during charging, using a charging signal such as that shown in FIG. 4.

FIG. 5 shows the waveform of the detected answer signal when using a charging current such as that shown in FIG. 4. During the time period 0 to $t_1$ which corresponds to the stabilization of the kenetics of the electrodes, the amplitude of the voltage of the answer signal is relatively large. Between times $t_1$ and $t_2$ the peak amplitude of the answer signal is constant and the maximum to minimum value is relatively small. After time $t_2$ the peak amplitude steadily increases and the swing also increases. By monitoring the answer signal, changes in the peak amplitude and swing of the signal can be noted, thus indicating the various phases of charging.

An embodiment of the method according to the invention will now be described.

A battery, sealed in a tight manner and having a maximum capacity of 4.8 Ah was charged for 4 to 4.5 hours using a pulsed current or signal having a frequency of 0.05 Hertz. The positive value of the intensity $I^+$ was 2A while its negative value $I^-$ was zero.

In addition, the times $T^+$ and $T^-$ were used for the duration of the positive and zero phases. These were equal and in the order of ten seconds. The mean current was thus 1A. The end of the charging period was determined by the rapid variation in the amplitude v of the answer signal and by its change in form. The charging current was stopped at this point as the battery had then reached a capacity of 4 to 4.5 Ah.

A battery having the same nominal features was charged for one hour only, using an intensity $I^+$ of 8A. Similar results to the preceding ones were obtained in this case.

As mentioned above, the variation in the answer signal in the case of a pulsed charging current may be measured by means of an oscilloscope or a voltmeter having a low time constant.

Figure 6:
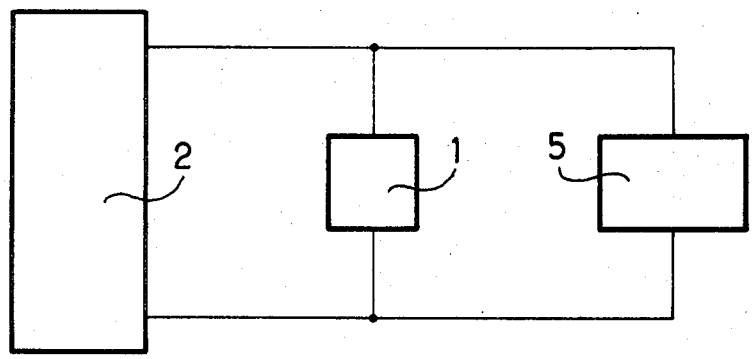
FIG. 6 is a block diagram showing the manner in which a galvanometer is used to monitor the battery answer signal.

Furthermore, the charging signal may be the voltage of the battery and the answer signal the current through the battery. FIG. 6 shows such an embodiment wherein the answer signal of the battery 1 is monitored by means of a galvonometer 5 having a low time constant.

Figure 7:
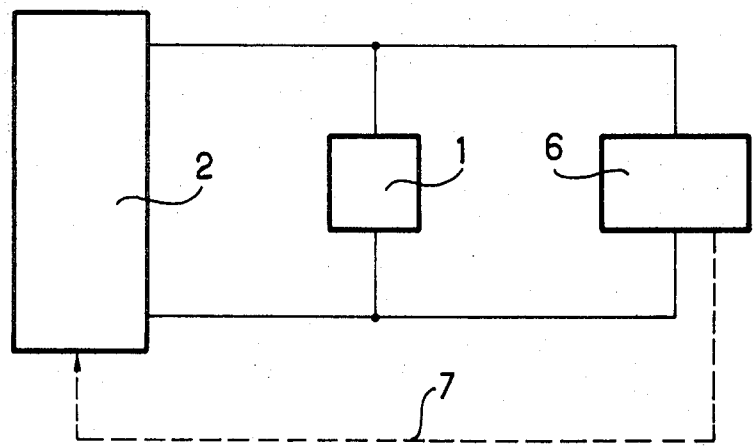
FIG. 7 is a block diagram showing the manner in which a differential relay is used to interrupt the battery charging signal.

Furthermore, it is very simple to render automatic a device implementing the method according to the invention. For example, FIG. 7 shows a differential voltmetric relay which interrupts the charging current 6 flowing from charging source 2 when the answer signal of battery 1 reaches an amplitude of 1.3 to twice that of a normal charge, such function being indicated by the arrow 7.

As the method according to the invention uses the kinetic variations of electrodes and not their intrinsic features such as structure, method of formation, etc., it consequently allows the easy detection of the end of the charging period of a storage battery, in particular of a sealed battery.

Furthermore, the use of a pulsed signal results in an improvement in the charging performance and a reduction in charging time as a consequence of the high charge intensities admissible during pulsed operation.

The method according to the invention is used advantageously in the storage battery industry.

Although the method which has been described is the most advantageous way of using the invention in a particular technical situation, it may be modified in various ways without departing from the scope thereof. Certain procedures may be replaced by others capable of fulfilling the same technical function.

I claim:

1. A method of charging a storage battery and detecting the completion of the charging comprising the steps of
   a generating a pulsed periodic charging signal having a mark-space ratio equal to approximately 1;
   b applying said charging signal to said storage battery; and
   c continuously monitoring an answer signal comprising variations in at least one of the parameters of said charging signal after it has been applied to said storage battery, said answer signal varying in accordance with the operational impedance of said storage battery, wherein a significant change in said answer signal occurs when said battery is completely charged, said parameters being amplitude.

2. A method according to claim 1, wherein said charging signal comprises a single component, pulsed periodically at a very low frequency.

3. A method according to claim 2, wherein said frequency is preferably between 0.1 and 0.01 Hertz.

4. A method according to claim 3, wherein said charging signal has a positive amplitude which is substantially higher than its negative amplitude.

5. A method according to claim 1, wherein said answer signal is the voltage of said battery and said charging signal the current.

6. A method according to claim 1, wherein said answer signal is the current through said battery and the charging signal the voltage.

7. A method according to claim 1, further including automatically interrupting said charging signal in response to a predetermined amplitude of said answer signal.

8. The method of claim 1 wherein said answer signal has an increasing mean value and a decreasing peak-to-peak amplitude during an initial stabilization period, an increasing mean value and a constant peak-to-peak value during charging, and a relatively rapid increase in mean value and peak-to-peak amplitude when charging is substantially complete.

9. A method of charging a storage battery and detecting the completion of the charging comprising the steps of:
   a generating a first charging signal having a predetermined magnitude;
   b generating a second charging signal having a sinusoidal variation in magnitude;
   c combining said first and second charging signals and applying the combined signal to the storage battery; and
   d continuously monitoring an answer signal comprising variations in at least one of the parameters of said charging signal after it has been applied to said storage battery, said answer signal varying in accordance with the operational impedance of said storage battery, wherein a significant change in said answer signal occurs when said battery is completely charged, said parameters consisting of amplitude and shape.

10. The method of claim 9 wherein said answer signal has a relatively large peak-to-peak value during an initial stabilization period, a relatively small peak-to-peak value during charging and an increasing peak-to-peak value at the completion of charging.

11. A method of charging a storage battery and detecting the completion of the charging comprising the steps of a generating a pulsed periodic charging signal having a mark-space ratio equal to approximately 1;

b applying said charging signal to said storage battery; and c continuously monitoring an answer signal comprising variations in at least one of the parameters of said charging signal after it has been applied to said storage battery, said answer signal varying in accordance with the operational impedance of said storage battery, wherein a significant change in said answer signal occurs when said battery is completely charged, said parameter being shape.

* * * * *